Feb. 13, 1940.  W. MAJUSICK  2,190,077
BOLT NUTTING MACHINE
Filed Aug. 11, 1938   9 Sheets-Sheet 1

Inventor
WALTER MAJUSICK
By John A. Bommhardt
Attorney

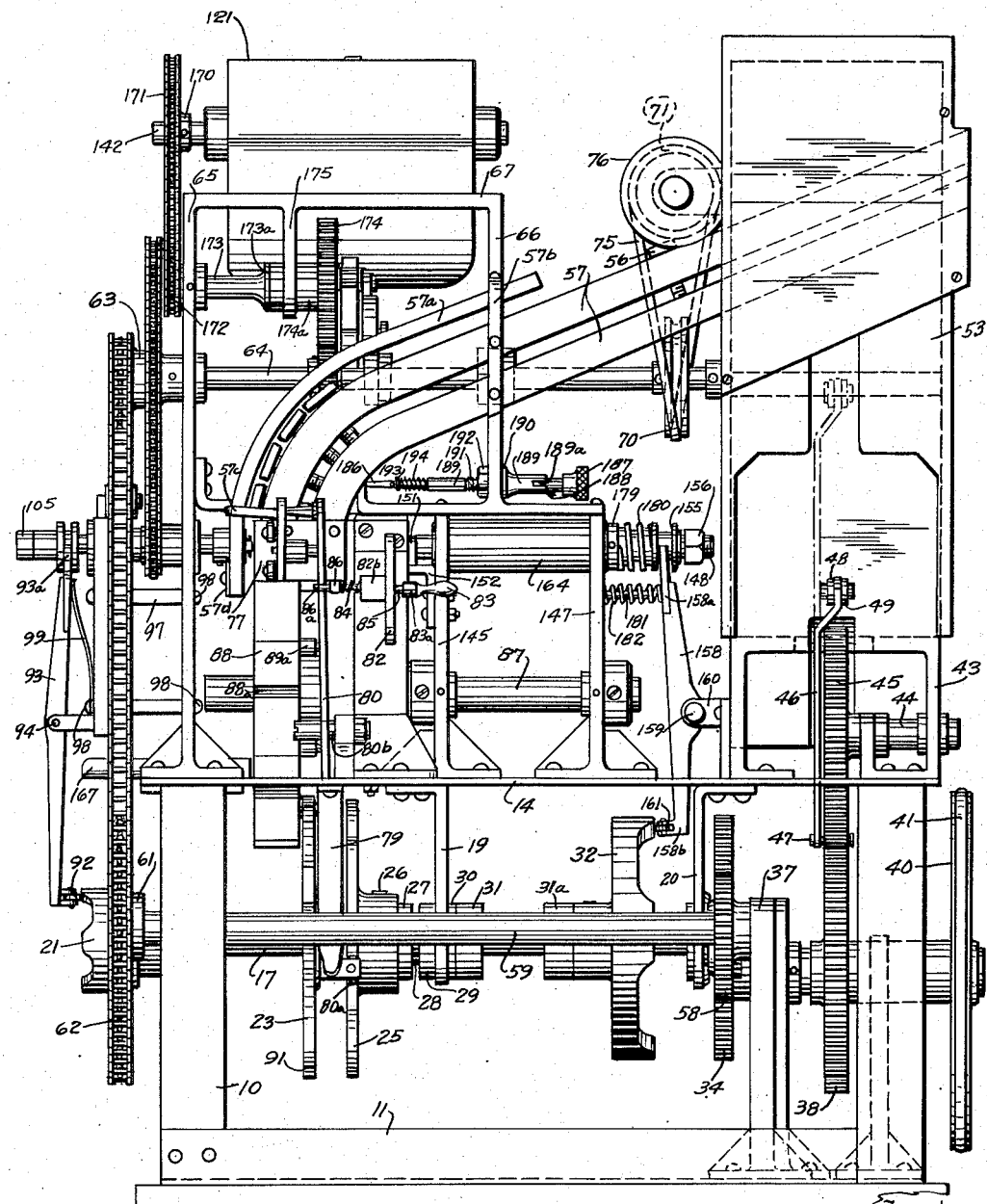

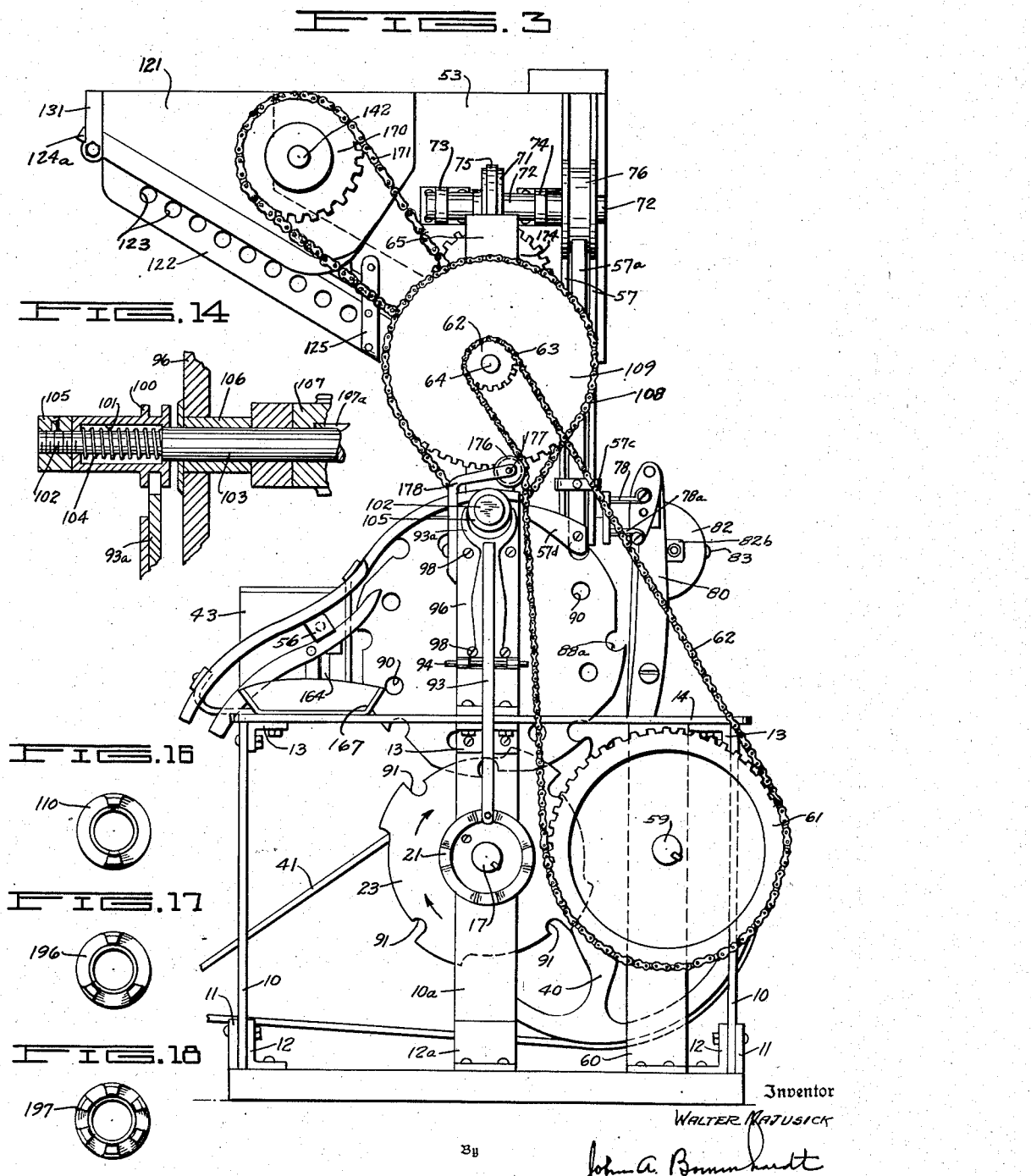

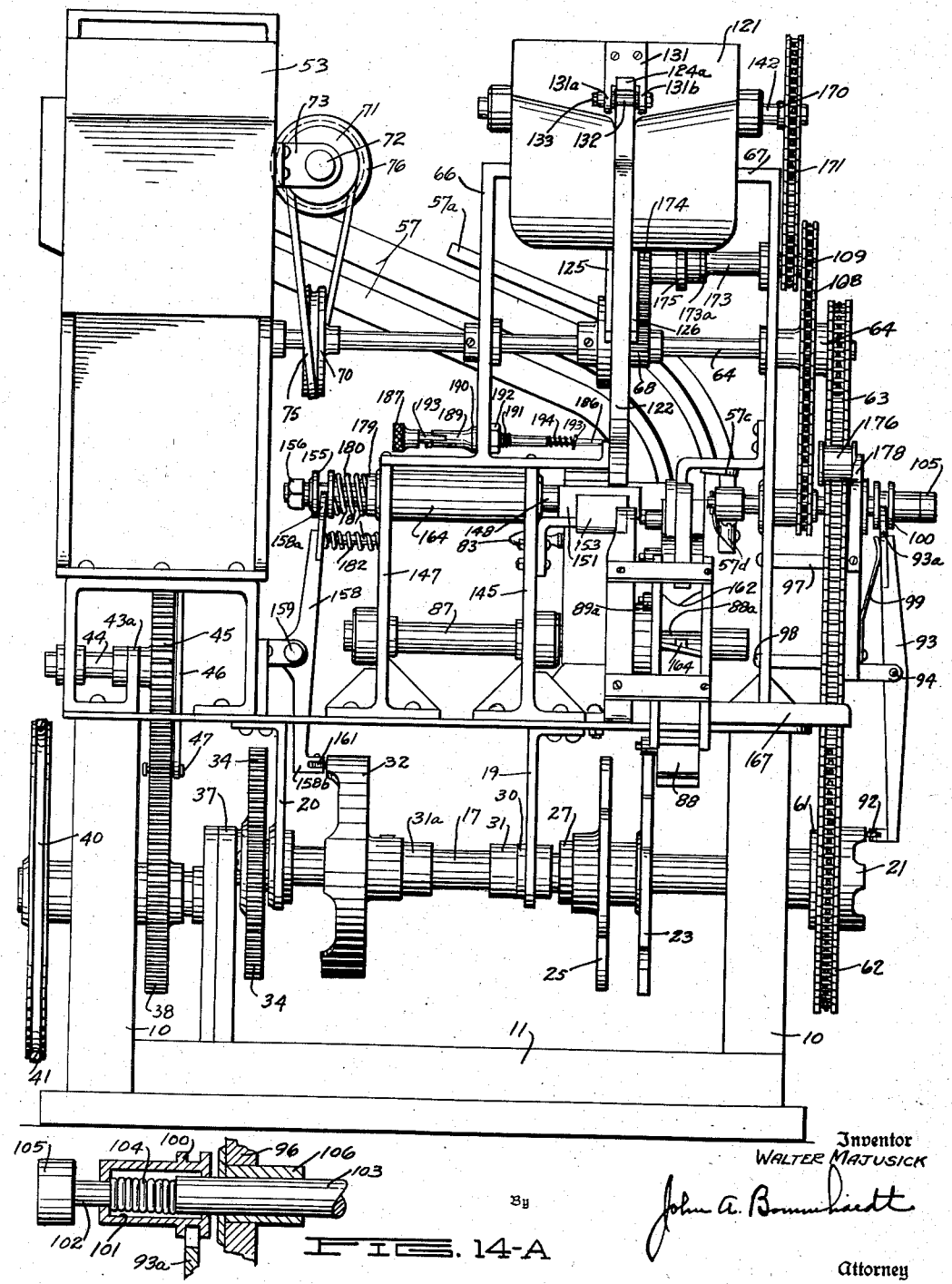

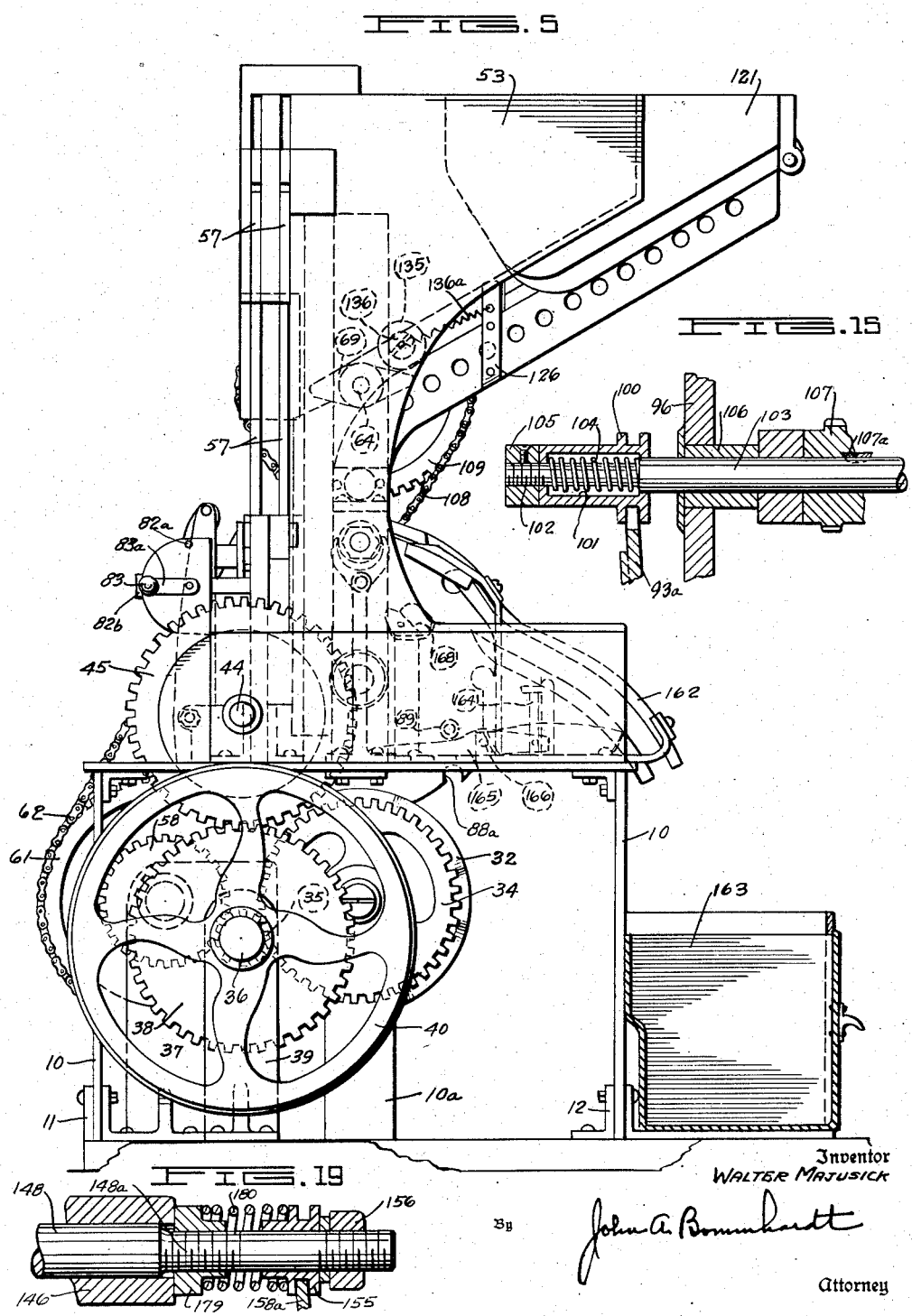

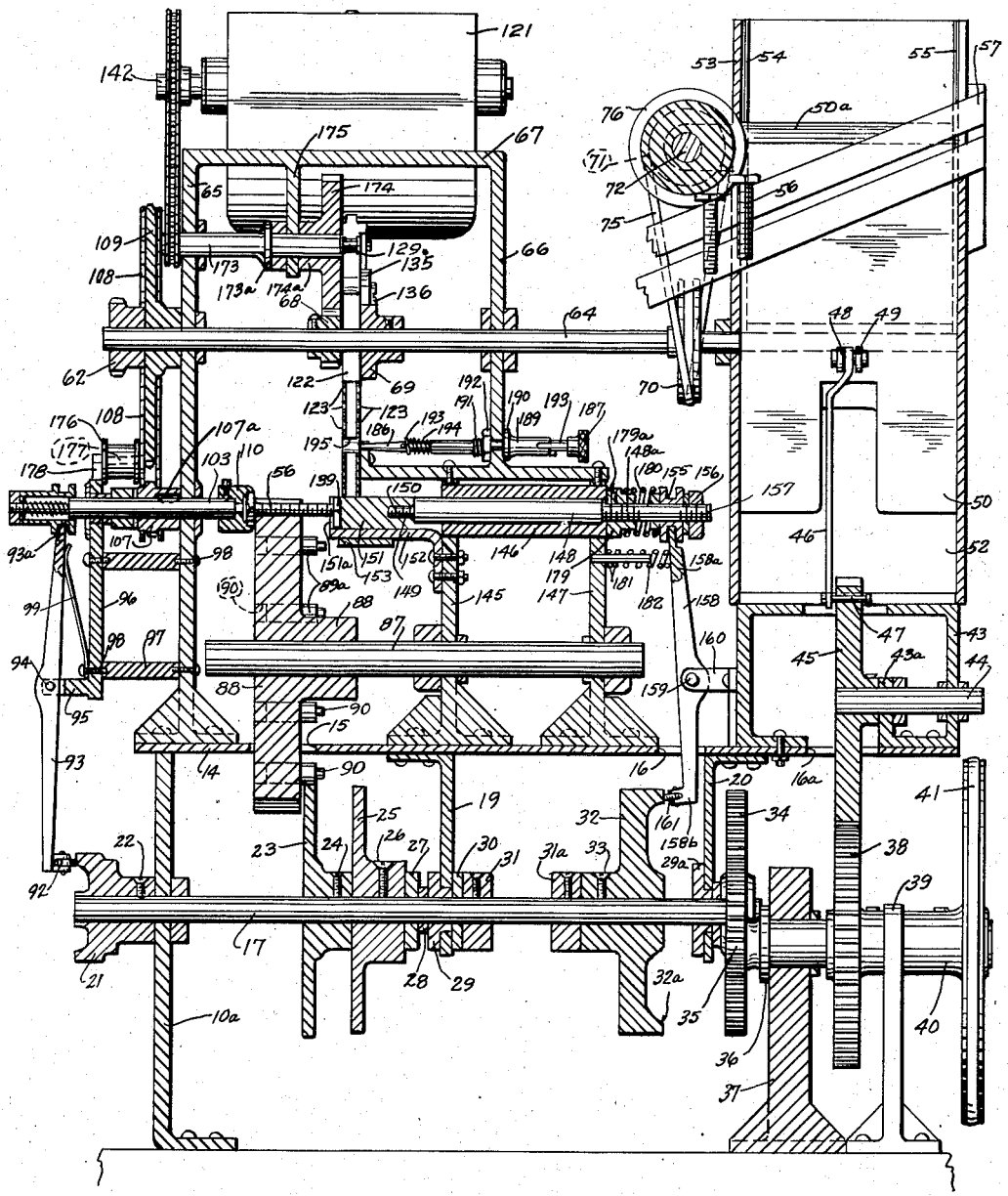

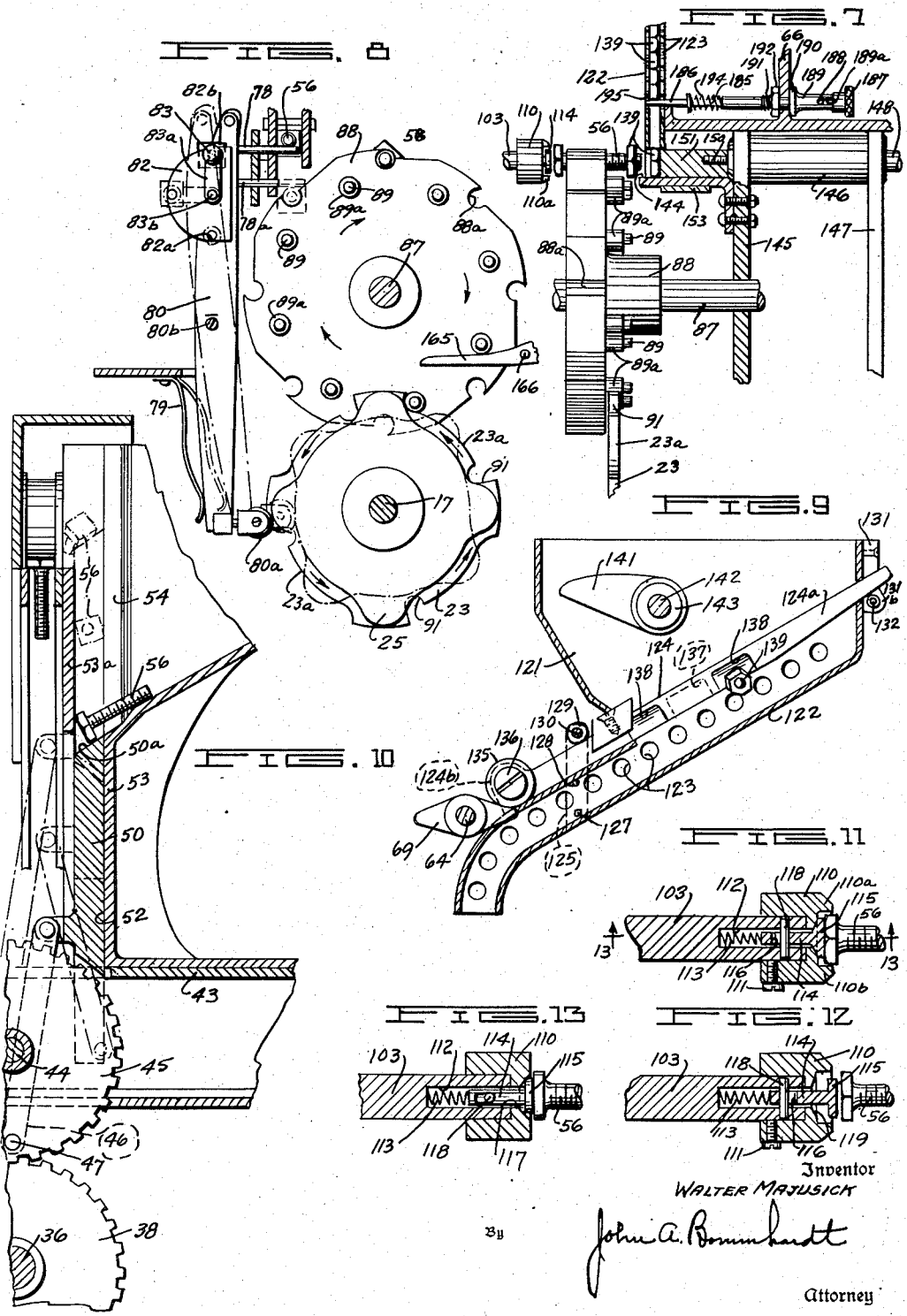

Feb. 13, 1940.    W. MAJUSICK    2,190,077
BOLT NUTTING MACHINE
Filed Aug. 11, 1938    9 Sheets-Sheet 8

Inventor
WALTER MAJUSICK
By John A. Bernhardt
Attorney

Feb. 13, 1940.                    W. MAJUSICK                    2,190,077
                               BOLT NUTTING MACHINE
                             Filed Aug. 11, 1938            9 Sheets-Sheet 9
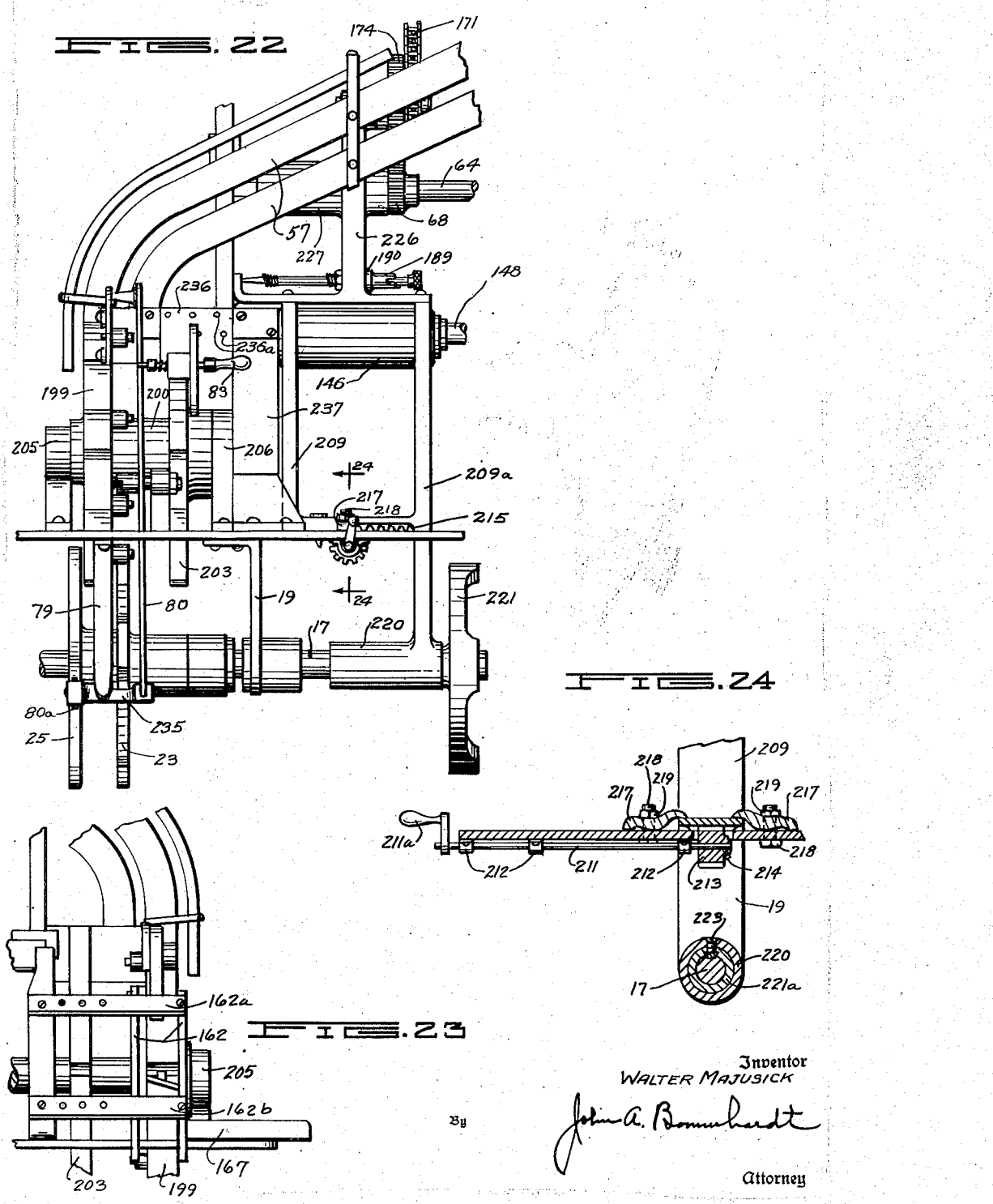
Inventor
WALTER MAJUSICK
Attorney Patented Feb. 13, 1940

2,190,077

UNITED STATES PATENT OFFICE 2,190,077

BOLT NUTTING MACHINE

Walter Majusick, Cleveland, Ohio, assignor of one-third to Walter L. Pierce, Lakewood, Ohio Application August 11, 1938, Serial No. 224,279

6 Claims. (Cl. 10—155)

My invention relates to bolt nutting machines and to the simplification and improvement thereof.

One object is to provide improved means whereby bolts and nuts are carried simultaneously to the same point from different sources and the nut held in position until the bolt is screwed within the nut, whereupon the assembled product is delivered to a receptacle.

Another object is to provide a means whereby the bolt may be delivered to another receptacle if for any reason the nut is not delivered to the meeting point; also the nut may be delivered to a third receptacle if the bolt should not reach the meeting point as may happen especially if the hoppers are not kept filled.

A further object is to provide a means whereby the progress of either the bolts or the nuts may be arrested when desired to check the progress of the other through their respective channels.

These and other objects and advantages may be noted from the following specification and its accompanying illustrations, in which:

Fig. 2 is a front elevation of the machine.

Fig. 3 is a left side elevation of Fig. 2.

Fig. 4 is a rear elevation of Fig. 2.

Fig. 5 is a right side elevation of Fig. 2.

Fig. 6 is a section on line 6—6 of Fig. 1.

Fig. 7 is a fragmentary section partly in elevation, showing the delivery point of the bolt and nut and the nut arrestor in closed position.

Fig. 8 is a fragmentary elevation partly in section showing the bolt delivery wheel, operating cams and bolt arresting device with the bolt suspended, dot-dash lines showing the method of delivery and cam operation.

Fig. 9 is a sectional view of the nut hopper and delivery channel.

Fig. 10 is a fragmentary sectional view of part of the bolt hopper and delivery elevator and the operating means.

Fig. 11 is an enlarged sectional view of the bolt turning head in turning position.

Fig. 12 is a similar section to Fig. 11 but with the head in inoperative position.

Fig. 13 is a section on line 13—13 of Fig. 11.

Fig. 14 is an enlarged sectional view of the head turning means in the operating position.

Fig. 14A is a view similar to Fig. 14, but showing the shaft extending outwardly and the spring compressed in the safety position.

Fig. 15 is a sectional view similar to Fig. 14 but showing the head turning means in the operative position.

Fig. 16 is a front end view of the turning head for square head bolts.

Fig. 17 is a similar view of the turning head for hexagon head bolts.

Fig. 18 is a similar view of the turning head for round head bolts.

Fig. 19 is an enlarged fragmentary front elevation of the nut thrust shaft illustrating the adjustment nuts and compression spring safety means.

Fig. 20 is a front elevation of the nut platform and thrust.

Fig. 22 is a fragmentary view of a front elevation of the modified form illustrated in Fig. 21 and showing the additional parts and operating and adjustable means.

Fig. 23 is a fragmentary view of the rear elevation of Figs. 21 and 22 showing the adjustable means.

Fig. 24 is a section on lines 24—24 of Fig. 22.

Figure 1:
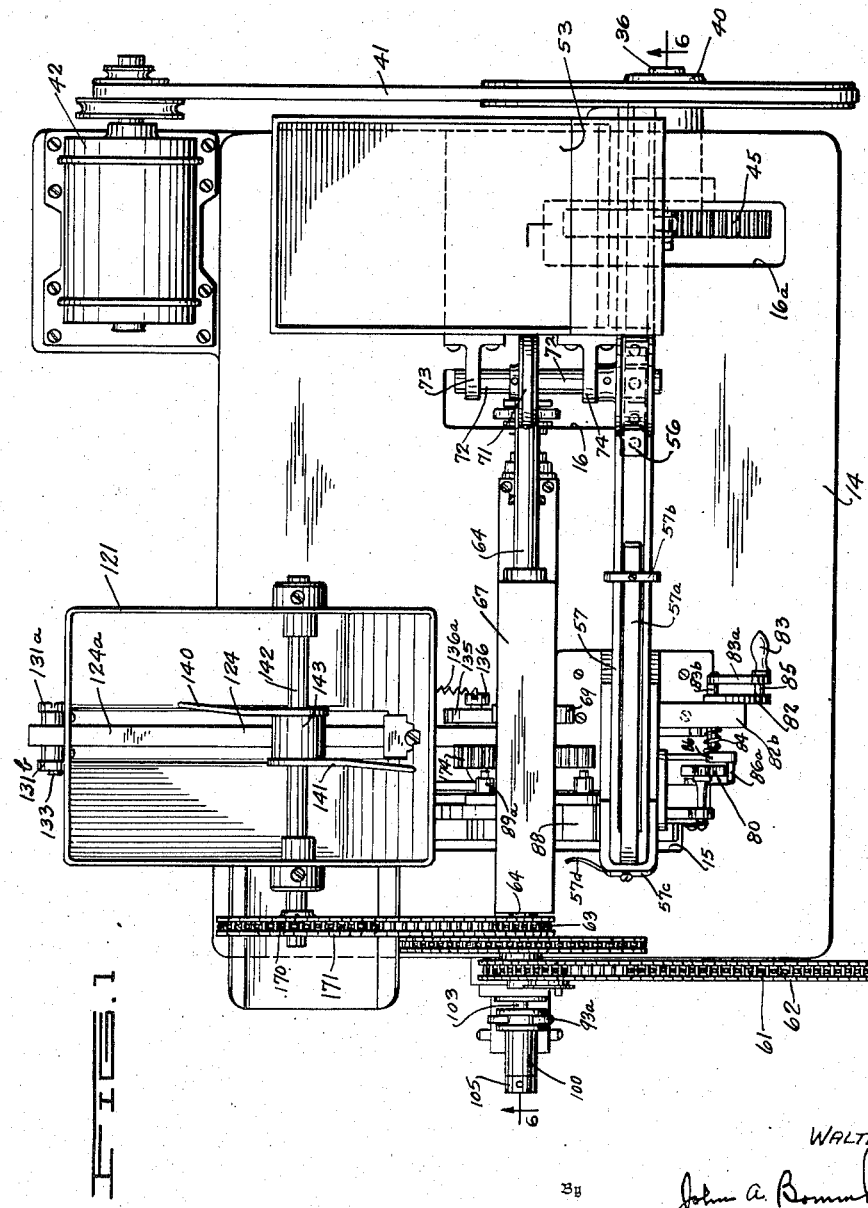
Fig. 1 is a top plan view of the machine and its motive power.

Again referring to the illustrations, a frame consists of supports 10 and 10a, and longitudinal bars 11 and angles 12 and 13 which support a table 14, said table having elongated openings 15, 16 and 16a therethrough at opposite ends of said table.

A driven shaft 17 is mounted beneath the table 14 through an end support 10a at one end and within bearing supports 19 and 20 at the middle and opposite end, said bearing supports being secured to the underside of the table 14.

A cam 21 is mounted over the projecting end of the driven shaft 17 and secured thereto by a pin 22. Mounted over the driven shaft 17 between the end support 10a and the bearing support 19 is a spacing cam 23 secured to said shaft by an adjusting set screw 24, and a second cam 25 is mounted on the shaft 17 adjacent cam 23 and is secured thereto by an adjusting screw 26, spacing washers 27 and 28 and bearing 29 being mounted over the shaft between the bearing support 19 and the cam 25.

A thin spacer 30 and a pair of adjustable spacers 31 and 31a are mounted over the shaft 17 outside of the bearing bracket 19; and adjacent the adjustable spacer 31a is a third cam 32 secured to the shaft 17 by an adjustable set screw 33 between said spacer 31a and a bearing 29a adjacent the bearing bracket 20.

A gear 34 is secured to the inner end of the shaft 17 adjacent the bearing bracket 20 and meshes with a reduction gear 35 mounted on the end of a drive shaft 36, adjacent its bearing support 37. A drive gear 38 is mounted on the drive shaft 36 between the bearing brackets 37 and 39; a pulley wheel 40 is secured to the shaft 36, outside of the bearing bracket 39, and is motivated by a belt or pulley 41 running from the pulley wheel 40 to the motor 42.

A mounting 43 secured to the top of the table 14 and partially covering the opening 16a in said table has an upturned flange 43a therein which serves as a bearing support for one end of a driven shaft 44, the opposite end being mounted through the wall of the said mounting 43.

A driven gear 45, mounted on the end of the driven shaft 44 adjacent to the flange 43a, meshes with the drive gear 38, the revolutions being one to one.

A pivoting operating arm or pitman 46 is secured at its lower end on a pin 47 mounted rotatably through the gear 45 adjacent the outer periphery thereof, the upper end of said pitman being pivotally secured between lugs 48 and 49 on the face of a sliding bolt lifting elevator 50, by a pin 51 mounted therethrough.

The bolt lifting elevator 50 is slidably mounted in a trough 52 in a bolt hopper 53, guides 54 and 55 preventing tipping or binding as the elevator 50 slides up and down within the trough 52 to receive the discharge its load of bolts 56.

The tapered upper edge 50a of the elevator 50 holds the bolts 56 against the wall 53a (Fig. 10) until the lifting of the elevator discharges the bolts into a gradient or inclined track 57; each complete revolution of the driven gear 45 motivated by meshing with the drive gear 38 causes the operating arm 46 to rotate and thus raise and lower the elevator once.

A top guard 57a secured over the open track 57 by yokes 57b and 57c prevents the traveling bolts from jumping out of said track as they move downward.

The reduction gear 35 meshes with a smaller driven gear 58 mounted on a driven shaft 59 adjacent the mounting or bracket 37, the said shaft being supported between the mounting brackets 37 and 60.

On the outer end of the shaft 59 is secured a sprocket 61 from which a link chain 62 drives a second smaller sprocket 63 mounted on the outer end of a cam shaft 64 mounted through bearing supports 65 and 66 of a bearing hanger 67.

A small gear 68 is secured on the cam shaft 64 between the supports 65 and 66 and adjacent thereto is a cam 69 also secured on said shaft. A pulley 70 is secured to the outer end of the shaft 64 adjacent the bolt hopper 53 and directly below a pulley 71 secured on a cross shaft 72 mounted between a pair of brackets 73 and 74 secured to the side of the hopper 53.

A crossed belt 75 is mounted over both pulleys 70 and 71 to motivate the shaft 72 and operate an agitator wheel 76 which forces the bolts 56 to assume an upright position in the gradient or track 57, said track conveying the bolts thus discharged downward to the release trap 77.

The release trap has a pair of cam operated pins or pistons 78 and 78a (Fig. 8) that reciprocate alternately with the in and out movement of the cam pivot arm 80 pivoting on the pin 80b as the roller 80a moves over the cam 25, and a spring 79, mounted on the underside of the table, presses the cam arm against the cam.

A bolt arrestor 82 has a setting knob 83 pivotally mounted in the center of the face of the bolt arrestor; a plurality of depressions 82a in the said face of the bolt arrestor receive the pin 85 of the setting knob 83 when the knob is drawn outward and rotated, a spring 84 is compressed between a bolt arrestor block 82b and an angular arm 86 within which a pivot pin 83b is journaled, the central position being the release position and the top and bottom positions being the arresting positions. As the knob rotates, the arm 83a mounted over the pivot pin 83b moves up or down causing a finger 86a, projecting from the angular arm 86, to rotate up or down and press against the cam arm 80 preventing the outward movement of the said cam arm, the bolt 56 is thus trapped as shown in Fig. 8. This is done at will to allow checking of the nut delivery line.

When the bolt 56 is to be released the pistons 78a and 78, respectively, move forward and back, then as they again move to the original position as shown in Fig. 8, the bolt 56 drops into one of the spaced grooves or notches 88a in the outer periphery of a delivery wheel 88 which is rotated clockwise on a shaft 87 as the spacer cam 23 rotates anti-clockwise.

Rollers 89a are mounted on pins 89 journaled in apertures 90 through the delivery wheel 88; open spaced apertures 91 in the outer periphery of the spacer cam 23 engage the rollers 89a and rotate the delivery wheel 88 until the bolt 56 reaches the top position as shown in Fig. 7, and the roller 89a has reached the inoperative level 23a of the cam 23 as shown in Fig. 8 whereupon the delivery wheel 88 stays in this position until the continuously rotating cam 23 rotates to the position where the next roller 89a, on the face of the delivery wheel 88, engages the next aperture 91 in the outer periphery of the cam 23, whereupon the process is repeated.

A guide spring 57d secured to the guard 57a, guides the bolts 56 and prevents their slipping out of place as they travel around the delivery wheel 88.

As the cam 21 rotates with the shaft 17 (Fig. 6) a roller 92 attached to a cam lever 93 moves in and out on the cam pivoting on a pin 94 thrust through a split bracket 95 projecting outwardly from the auxiliary shaft support 96 attached by bars 97 and bolts 98 to the bearing support 65. A spring 99 is attached to the auxiliary shaft support 96 and projects upward and outward against the top of the cam lever 93.

The cam lever 93 terminates at its upper end in a yoke 93a, said yoke fitting within an H sleeve 100 (Fig. 14a) which has an aperture 101 therethrough, and said H sleeve is mounted over the smaller shouldered end 102 of a head operating shaft 103; a spring 104 is mounted over the shouldered portion 102 of the shaft 103 within the aperture 101 of the H sleeve 100, and a head 105 is secured over the outer end of the shouldered portion 102 of the shaft 103; said shaft being free to reciprocate within the H sleeve 100 as well as rotate.

This provides a safety means whereby jamming is eliminated due to the reciprocating action under excessive pressure, the shaft moving outwardly and compressing the spring 104 as illustrated in Fig. 14a, thus relieving excessive pressure.

The shaft 103 is slidably and rotatably mounted within a bearing 106 mounted through the auxiliary shaft support 96 and the bearing support 65. A small sprocket 107 is also mounted over the shaft 103 by means of a key 107a in a keyway in the shaft, said sprocket being mounted between the auxiliary support 96 and the bearing support 65. A link bolt 108 connects the sprocket 107 to another larger sprocket 109 secured on the cam shaft 64 outside of and adjacent the bearing support 65.

The shaft 103 has secured at its inner end a bolt turning head 110 by a set screw 111; the end of said shaft 103 has an orifice 112 therein within which is mounted a spring 113; a sliding piston 114, terminating in a head 115 at its outer end and having a slot 116 therethrough at its inner end, is mounted through an aperture 117 in the bolt turning head 110 and projects within the spring 113 in the orifice 112; a pin 118 is mounted through the slot 116 and projects within the shaft 103, thus the piston 114 slides on the pin 118, the head 115 seating itself, within a seat or recess 119 in the bolt turning head 110.

As the head of the bolt 56 moves up to the top position in the groove 89 of the delivery wheel 88, the shaft 103 is rotated and thrust forward until the head of the bolt 56 enters the aperture formed by the lugs 110a of the bolt turning head 110, the said head then turning the bolt 56 until the threaded end enters the nut 139 at the top or meeting point.

A nut hopper 121 mounted at the rear of the machine has a narrow gradient slide or chute 122 along its bottom edge, each side having a plurality of perforations 123, a reciprocating distributing arm 124 is movably mounted on top of the slide 122 and retained thereon by a pair of guide bars 125 and 126 secured to opposed sides of the gradient slide 122 and being secured thereto by pins 127 and 128 therethrough; a roller 129 is mounted between the top ends of the bars 125 and 126 on a pin 130.

A split roller mounting 131 is secured to the outer surface of the rear wall of the nut hopper 121 adjacent the top thereof, a roller 132 is mounted over a pin 133 journaled through the split bosses 131a and 131b of the mounting 131, the tapered end 124a of the reciprocating distributing arm 124 rides over the roller 132, while the body of the arm 124 rides under the roller 129 as the arm reciprocates.

A roller 135 is secured to the forward boss end 124b of the reciprocating distributing arm 124 by a pin 136, said roller moving along the top of the slide 122 as it is motivated by the cam 69 mounted on the shaft 64, said cam being activated by the revolving shaft 64.

A spring 136a is secured at one end to the pin 136 and the opposed end to the bar 126 to draw the roller back as the cam 69 revolves.

Alternating slots 137 and 138 on opposed sides of the reciprocating distributing arm 124, receive the nuts 139 as agitator arms 140 and 141 revolve on a shaft 142 mounted through the nut hopper 121.

A sprocket 170 secured over the outer end of the agitator shaft 142 is connected by a link chain 171 to a small sprocket 172 secured over the outer end of a shaft 173, said shaft has a flanged center portion 173a tapered outward, the flat surface pressing against the end of a gear hub 174a of the gear 174 rotatably supported in a bearing hanger 175 of the bearing support 67. Said gear 174 meshes with the gear 68 on the shaft 64 and drives the shaft 173 which causes the sprockets 172 and 170 to turn the agitator shaft 142 and thus revolve the agitator arms 140 and 141.

A spacer 143 is mounted over said shaft 142 between the agitator arms 140 and 141 so that the arms revolve at each side of the reciprocating distributing arm 124; the nuts 139 fall through the slots 137 and 138 in said arm and drop into the gradient slide 122 within which they move downward until said nuts drop, one at a time, on a shelf, platform or holder 144 attached to a support 145 mounted on table 14.

A sleeve 146 is mounted through a pair of supports 145 and 147 mounted on the table 14, and a reciprocating plunger 148 is slidably mounted therein, said plunger having a reduced threaded end 149 which is screwed within a threaded aperture 150 in an elongated thrust carriage 151 slidably mounted upon an angular platform 152.

A U shaped clamp 153 is mounted around the platform 152 and is secured to each side of the carriage or block 151, moving back and forth with said carriage while the platform 152 remains stationary.

Propecting portions 151a and 151b of the carriage 151 are formed by a recess 154 in the forward end of the said carriage, said recess being directly below the lower end of the gradient slide 122 when the carriage 151 is in the retracted position as illustrated in Fig. 7.

The opposite end of the plunger 148 has mounted thereon an H sleeve 155, a nut 156 is screwed over the threaded end 157 of the said plunger 148 for adjustment and to retain the H sleeve thereon, an adjustable tension nut 179 is screwed over the inner threaded portion 148a of the plunger 148 to provide a means for correcting the adjustment for synchronizing the reciprocating action of the plunger 148 with that of the shaft 103, the adjustment nut 156 providing the means for adjusting the tension of the safety spring 180 between the nut 179 and the H sleeve 155 which permits the same safety action as that of the shaft 103 and spring 101, without rotation however.

A cam lever arm 158 is mounted upon a pin 159 within a split boss 160 secured to the mounting 43, the upper yoke portion 158a of said arm extending within the H sleeve 155, the lower portion 158b has a roller 161 rotatably secured thereto, said roller moving upon the cam edge 32a of the cam 32 rotating on the shaft 17.

A pin 181 is inserted through the bearing bracket 147 and has an expansion spring 182 mounted thereover which presses against the upper end 158a of the cam lever arm 158 to counterbalance the pressure of the cam 32 against the roller 161 mounted in the opposite end of the arm 158b.

Thus as the cam 32 revolves the cam lever arm 158 pivots and thrusts the plunger 148 in a reciprocating action within the sleeve 146 causing the carriage 151 to move forward and back on the platform 152, a nut 139 dropping upon the platform between the projecting portions 151a and 151b of the carriage 151 with each retraction of the said carriage.

The forward thrust of the carriage 151 is synchronized with the forward thrust or movement of the bolt turning head 110 by the adjustable tension nut 179 which is then secured in that position by a set screw 179a; as the bolt 56 reaches the peak position in the delivery wheel 88, as illustrated in Fig. 6, the nut 139 is carried forward simultaneously to the edge of the platform 152 by the forward thrust of the carriage 151; the bolt turning head 110 assumes the position shown in Fig. 11 in which the bolt head is caught within the lugs 110a of the bolt turning head 110, the said turning head revolves as the delivery wheel 88 remains in this position (as illustrated in Fig. 8) the bolt 56 being turned or screwed within the nut 139 whereupon the assembled unit is carried downward to the rear of the delivery wheel 88 and drops within a chute 162 and is delivered therefrom into a container 163.

A release bar 164 moves up and down vertically with the action of a lever 165 mounted pivotally on a pin 166, said lever being pivoted as the rollers 89a on the delivery wheel 88 contacts said lever 165 and carries the inner end of the lever downward until the contact is broken whereupon the lever 165 again moves up to the first position, the release bar 164 being up when the inner end of the lever is in the down position and moves down as the inner end of the lever moves back to its original position.

If for any reason the nuts 139 are not released, the bolt 56 travels around the delivery wheel 88 to the chute 162, but as the weight of the bolt is unbalanced due to the lack of the nut 139 to balance the head of said bolt, the bolt tips over the chute and drops into a tray 167 secured on the table 14 adjacent the chute 162.

If the bolt 56 does not release and fails to meet the nut 139, the nut is projected forward and falls into a trough 168 under the carriage 151 and is ejected on the opposite side of the chute 162 and adjacent thereto.

If a bolt or nut goes through without being threaded, it will not injure the machine as the operation will complete itself by ejecting both bolt and nut into the discard tray 167 and trough 168 respectively.

If it becomes necessary to check the passage of the bolt 56, the nuts 139 may be locked within the gradient slide 122 as illustrated in Fig. 7; a shaft 185 tapered at one end 186 has a knurled head 187 at its opposite end and a pin 188 therethrough adjacent the head 187 is mounted through a sleeve 189; said sleeve has a slot 189a at its outer end and is flanged at 190, said flange pressing against the outer surface of the support 66; the opposite end of the sleeve 189 has a threaded portion 191 thereon and a nut 192 turned thereon against the inner surface of the suport 66, thus holding the sleeve 189 in a rigid position.

A flange 193 on the shaft 185 adjacent the tapered portion 186 retains a spring 194 on the shaft 185 between the sleeve 189 and said flange 193, thus the knurled head 187 may be drawn outward, compressing the spring 194 between the flange 193 and the sleeve 189; and rotated until the pin 188 registers with the slot 189a in the sleeve 189, whereupon the knurled head is released and the pin enters the slot which causes the tapered end 186 to enter an aperture 195 in the gradient slide 122 thus preventing the further passage of the nuts 139.

An idler 176 is supported on a pin 177 mounted through an arm 178 secured to the rear of the auxiliary shaft support 96 to take up the slack in the link chain 62 between sprockets 61 and 63.

Interchangeable heads 196 and 197 for hexagon and round head bolts may replace the head 110 for square head bolts as illustrated in Figs. 16, 17, and 18.

The general operation is evidently aparent from the above, but it may be summarized as follows: bolts are fed from the hopper 53 down the track 57 to the notched wheel 88 by which they are stepped around to threading position. Nuts are fed from the hopper 121 down the chute 122 to the holder 144, where they are registered with the bolt then at the threading position. The nut is then advanced by the slide 151 and at the same time the bolt is advanced and rotated by the head 110 on the rotary reciprocating shaft 103 and the nutted bolt is carried along and discharged by the next operation of the wheel 88 which brings the next bolt to position to receive the next nut; and so on. The operations are properly timed by the cams. The action of the various safety devices and antijamming devices is evident from the foregoing particular description.

In the modified form, of the machine hereinabove described, the Figs. 21 through 24 illustrate a means whereby bolts of any reasonable length may be delivered through the machine, receiving nuts thereon as heretofore described.

Figure 21:
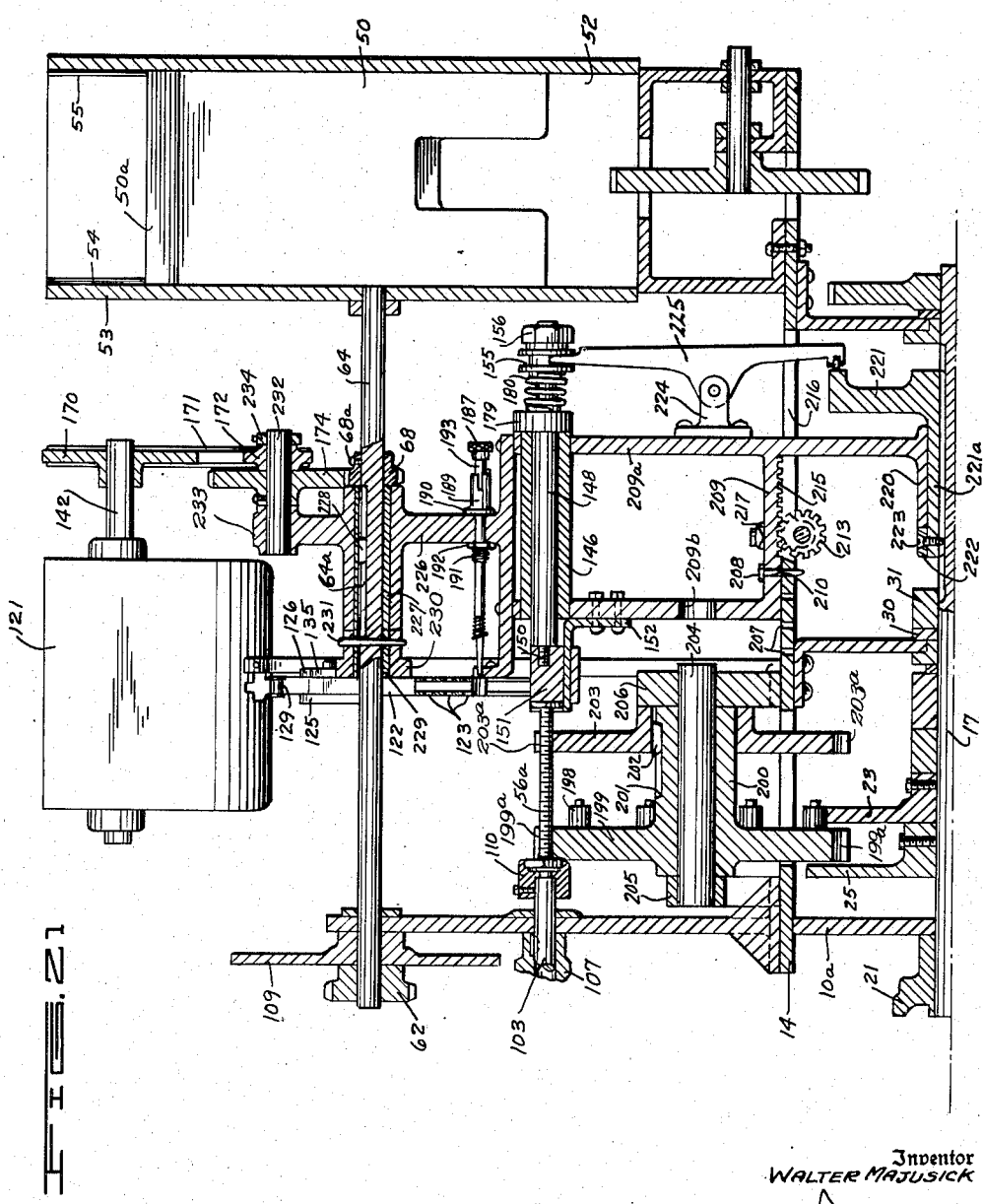
Fig. 21 is a section similar to Fig. 6, but showing a modified form of the machine adaptable to different lengths of bolts.

It was deemed not necessary to show all details in Fig. 21 as were shown in Fig. 6, nor in Figs. 22 and 23 as shown in Figs. 2 and 4, but enough are shown to identify the altered and substituted parts and their positions in relation to the balance of the parts as shown in Figs. 6, 2 and 4.

When it is desired to assemble nuts on bolts that are of the same diameter but different lengths it is necessary to have different parts of the mechanism adjustable to the different bolt lengths which in turn necessitates some rearranging of other parts.

The cam 25 mounted on the shaft 17 adjacent cam 23 is now positioned to the left of the thin new delivery wheel 199 which replaces the delivery wheel 88, the cam 23 is moved slightly to the left to properly contact the rollers 198 of the wheel 199. The delivery wheel 199 has a long hub 200 with an elongated keyway 201 therein with a small key 202 over which is mounted a supporting delivery wheel 203.

A short shaft 204 is substituted for the long shaft 87 and is supported within bearing brackets 205 and 206 mounted on the table 14. Thus it will be seen that the suporting delivery wheel may be mounted over the hub 200 in adjustable positions relative to the length of the bolts 56a.

The spaced grooves or notches 203a, in the said supporting delivery wheel, register with like spaced grooves or notches 199a in the delivery wheel 199 and support the end of the bolt 56a therein.

A plurality of spaced apertures 207 in the table 14 permit the insertion of a pin 208 therein to set the adjustable mounting carriage 209 when properly placed, the said pin projecting through an aperture 210 in the mounting carriage which registers with any one of the apertures 207 in the table 14.

A hand operated shaft 211 mounted through bearing brackets 212 secured on the bottom surface of the table 14, has a gear 213 secured on its inner end by a set screw 214, said gear contacting and meshing with a gear rack 215, on the underside of the adjustable mounting carriage 209, through a slotted aperture 216 in the table 14 as the shaft 211 is rotated by the handle 211a.

A clamping dog 217, tightened by a bolt 218 and nut 219 to the table 14, locks the mounting carriage 209 when properly set in position.

A bearing mounting 220 on the extreme lower end of the upright 209a of the mounting carriage 209 is secured over the hub 221a of the cam 221, which replaces cam 32, mounted on the shaft 17 by a lock spacer 222 and set screw 223.

An aperture 209b in the adjustable mounting carriage 209 registers with the shaft 204 and is for the purpose of quickly assembling or moving the shaft without disturbing the balance of the mechanism when the mounting carriage 209 is in the closer adjustable positions.

A split bracket 224 is mounted on the outer surface of the upright 209a to replace the split boss 160 shown in Fig. 6, and a reversed cam lever arm 225 replaces the arm 158 which operates the nut operating mechanism through the rotation of the cam 221 in precisely the same manner as does the cam lever 158 through the cam 32 as shown in Fig. 6 and hereinabove described.

A top mounting 226 secured to the top of the mounting carriage 209 and upright 209a moves with the said mounting carriage, the nut arresting assembly being mounted therein in the same manner as in the original machine.

A center bearing mounting 227 has the shaft 64 mounted therethrough said shaft has a keyway 64a therein and a key 228 in the keyway over which is mounted a bushing 229 within the center bearing mounting. A cam 230 which replaces the cam 69 is mounted over the bushing 229 and secured thereto by a taper pin 231 which projects through the shaft 64.

The gear 68 is relocated adjacent to the outer end of the center bearing mounting and secured to the shaft 64 by a set screw 68a, said gear meshing with the gear 174 which is now mounted over a shaft 232 which shaft rotates within a bearing boss 233 at the top of the mounting carriage 209.

The sprocket 172 is mounted over the end of shaft 232 and secured by a lock washer 234. The sprocket 170 is mounted on the agitator shaft 142 to the right of the nut hopper 121 instead of the left and is connected by the link chain 171 to the smaller sprocket 172.

It is necessary to change the position of the spring 79, slightly to the left and to increase the length of the roller spring arm 235 to enable the roller 80a to move along the outer periphery of the cam 25 in its new position.

The gradient or track 57 is attached to a supporting plate 236, said plate having apertures 236a at set intervals to secure said plate to the movable support 237 in any of its adjusted positions without changing the position of the gradient and the bolt arresting mechanism The adjustable positions of the support are necessary due to the clearance allowance between the gradient 57 and the support for the additional length of the bolts.

The rear chute 162 has extension bars 162a and 162b for adjustment purposes also, due to the extra lengths of said bolts and to prevent an overbalance in weight as the bolts and nuts are discharged.

I claim:

1. In a machine for screwing nuts on bolts, the combination of a bolt carrying wheel rotating step by step, a rotary and reciprocating shaft having a socket head thereon engaging the head of a bolt while it is held by the wheel in the threading position, a nut holder reciprocating in axial alinement with said shaft and adapted to hold a nut while the bolt is screwed thereinto, and means to simultaneously move said shaft and said holder axially toward and from each other, and means to rotate the shaft, whereby said axial movement of the shaft causes the bolt to be advanced to engage the nut while the latter is being advanced by the holder.

2. The combination stated in claim 1, the means to advance the shaft and holder toward each other including a pair of oppositely acting levers acting against the outer ends of the shaft and holder respectively, a timing shaft, and a pair of cams carried by the timing shaft and respectively engaging the levers.

3. The combination stated in claim 1, the head having therein a spring pressed plunger to eject the bolt after the nut is screwed thereon, said plunger having an enlarged head which seats against the bottom of the socket.

4. The combination stated in claim 1, the means for rotating the wheel step by step and for advancing and retracting the reciprocating shaft and the nut holder comprising a timing shaft and cams thereon respectively connected respectively to the reciprocating shaft, the holder, and the bolt carrying wheel.

5. The combination stated in claim 1, the nut holder comprising a reciprocating block to advance a nut toward the bolt when in threading position, means to operate the block comprising a rod, a sleeve on the rod, a lever engaging said sleeve, a timing shaft, and a cam on the timing shaft acting against the lever.

6. In a machine for screwing nuts on bolts the combination of a bolt carrying wheel rotating step by step, a rotary and reciprocating shaft having a socket head thereon engaging the head of a bolt while it is held by the wheel in the threading position, means to rotate the shaft, a sleeve on the outer end of the shaft, a lever engaging said sleeve to advance and retract the shaft, a nut holder at the opposite side of the wheel, comprising a shelf on which a nut may rest, a plunger slidable across said shelf in line with the axis of the shaft, a sleeve on the plunger, a lever engaging said sleeve, and means to synchronize the movement of the wheel, the shaft and the plunger comprising a timing shaft and a plurality of cams thereon engaging the levers and the wheel respectively.

WALTER MAJUSICK.